US006018850A

United States Patent [19]

Lorber

[11] Patent Number: 6,018,850

[45] Date of Patent: Feb. 1, 2000

[54] CLIP FOR SHEETS OF PAPER

[76] Inventor: Kurt Lorber, Schurwaldstrasse 114, D-73773 Aichwald, Germany

[21] Appl. No.: 09/144,154

[22] Filed: Aug. 31, 1998

[30] Foreign Application Priority Data

Sep. 6, 1997 [DE] Germany ........................... 197 39 090

[51] Int. Cl.[7] ................................. B42F 1/00; F16B 2/00

[52] U.S. Cl. ............................... 24/67.9; 24/16 R; 24/543

[58] Field of Search .................................. 24/67.9, 67 R, 24/67.3, 543, 30.5 P

[56] References Cited

U.S. PATENT DOCUMENTS

| | | | |
|---|---|---|---|
| D. 235,127 | 5/1975 | Grant | 24/543 |
| 3,296,673 | 1/1967 | Kirkpatrick | 24/67.9 |
| 3,797,076 | 3/1974 | Watkin | 24/67.9 |
| 5,010,629 | 4/1991 | Hirzel | 24/67.9 |
| 5,305,500 | 4/1994 | Tucker | 24/30.5 P |
| 5,337,987 | 8/1994 | Sawatsky | 24/543 |
| 5,384,935 | 1/1995 | Hunke et al. | 24/543 |

FOREIGN PATENT DOCUMENTS

| | | |
|---|---|---|
| 2631568 B2 | 2/1979 | Germany . |
| 8013894 | 8/1980 | Germany . |
| 30 19 707 | 10/1981 | Germany . |
| 4036882 C1 | 6/1992 | Germany . |
| 9309368 | 12/1994 | Germany . |
| 2 078 849 | 1/1982 | United Kingdom . |

*Primary Examiner*—Victor N. Sakran
*Attorney, Agent, or Firm*—Quarles & Brady LLP

[57] ABSTRACT

A clip for paper sheets is proposed, which is injection moulded in one piece from plastic. The clip is cross-sectionally U-shaped, the two legs interconnected by a web being flat and their flat sides face one another. In the gap formed in this way between the two legs is placed a clamping leg, which is connected in one piece to the inside of one leg and from there is inclined in the direction of the other leg and in the direction of the web. The paper sheets are slid into the gap, it being possible for the clamping leg to deform, whilst making difficult a drawing out of the sheets.

12 Claims, 2 Drawing Sheets

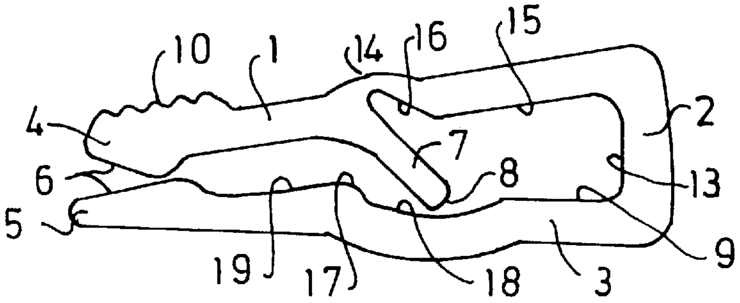
FIG. 1
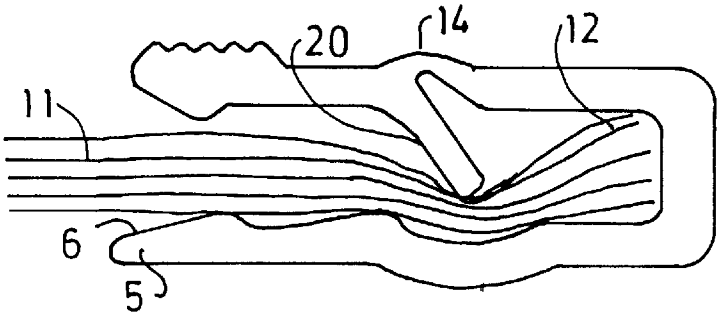
FIG. 2
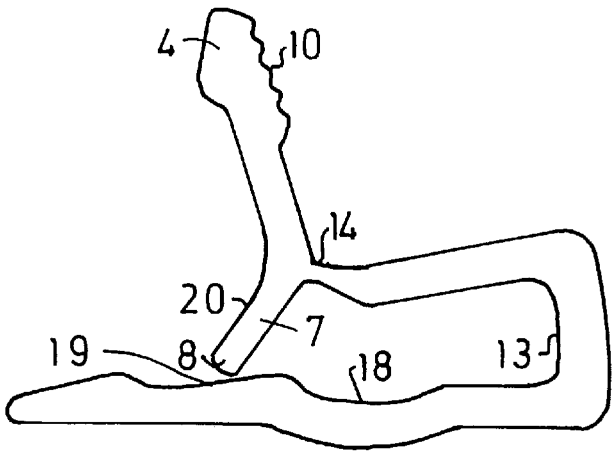
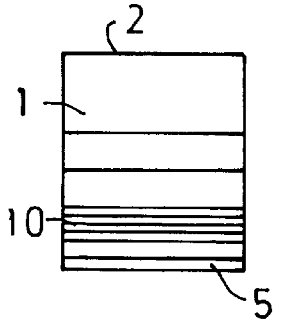
FIG. 4
FIG. 3

CLIP FOR SHEETS OF PAPER

Various devices are known for clipping together sheets of paper. Firstly the long known paper clip exists, which can be made both from metal and from plastic. In addition, staples are known, which are driven through the paper with the aid of a device and bent round. For thicker stacks so-called binder clips are known, which can also be made from metal or plastic.

The problem of the invention is to provide a clip for clipping together flat material layers, which can be easily used, can be employed for different stack thicknesses and reliably holds together the layers of sheets. However, the clip must be redetachable again.

For solving this problem, the invention proposes a clip having the features specified in claim 1. Further developments of the invention form the subject matter of subclaims, whose wording, like that of the abstract, is made by reference into content of the present description.

The clip proposed by the invention to a certain extent is like a piece of U-section, which has a certain length. The sheets of paper are slid in between the two legs. The locking leg gives way on sliding in the paper or, in other words, on pushing the clip onto the paper sheets, so that the latter can be slid in until the web or crosspiece is reached. The extraction of the sheets or the removal of the clip from the stack is made difficult through the locking leg.

By choice of material and geometry, it is possible to ensure that the clipping or clamping force can be chosen as a function of the desired application.

In order to facilitate the sliding of the clip onto the edge of a stack of paper sheets, according to a further development of the invention the inside of the free end of at least one leg of the clip can be bevelled, preferably the insides of the free ends of both legs. This facilitates the sliding or pushing onto a stack and in this way improves use, if it is borne in mind that not all the paper sheets engage tightly on one another at the edge.

According to a further development, the outside of a leg can be roughened or grooved in the vicinity of its free end. As a result said leg can be more easily grasped. Preferably, this construction is provided on the front leg.

According to the invention, the clip can be constructed in such a way that the web and legs are substantially of the same width throughout.

It is also possible for both legs to be of roughly the same length. The width of the clip and the length of the legs can also be approximately identical.

As the clip is also to be suitable for stacks of only two sheets of paper, according to the invention the locking leg can contact the opposite leg.

According to the invention, for further improving handling, the leg opposite to the locking leg has a concave depression. This depression is only concave in one direction, so that the surface of the depression is cylindrical. This depression permits the housing of thick paper stacks, without impairing the locking leg.

According to a further development, with the clip in the undeformed state, i.e. without inserted paper, the free end of the locking leg is located in the vicinity of the end of the concave depression remote from the web. The concave depression facilitates the swinging back of the locking leg, which performs a movement during which its free end moves on a circular arc.

According to a further development of the invention, the end of the depression remote from the web is defined by a prominence, i.e. a type of rib or a raised border of the depression. This raised edge or border of the depression prevents the swinging or pivoting out of the locking leg.

According to the invention, roughly in the centre between the web and the free end of its leg, the locking leg can be shaped onto the latter.

According to another development of the invention, the clip leg having the locking leg has a film hinge, which is positioned roughly in the centre between the web and the free end of the leg. Thus, the clip can be swung up both prior to the sliding onto a stack of papers and during removal.

According to a further development of the invention, between the film hinge and the free end of the leg, the locking leg is shaped onto the latter, preferably in the immediate vicinity of the film hinge. This means that e.g. prior to the mounting on a paper stack the clip is opened, slid onto the stack and then the opened part of the front leg is closed again. The locking leg is shoved over the prominence at the front edge of the depression and over the paper stack, so that there is a clearly perceptible locking of the paper stack. In the case of fixed stacks, the locking leg can in this way be released from the stack.

According to a further development of the invention, the clip can be designed in such a way that on pivoting about the axis of the film hinge, the free end of the locking leg is moved in a circle penetrating the inner contour of the facing leg of the clip. In this case, the facing leg of the clip must give way laterally on closing.

In order to facilitate the closing of the clip, according to the invention, between the free end of the leg facing the locking leg and the prominence in front of the depression a ramp is formed.

The ramp is preferably only provided on one side, because a further development of the invention proposes that the prominence slopes steeply towards the concave depression and preferably the front side of the undeformed clip leg runs tangentially to the downward slope of the prominence.

The invention proposes that the clip be made by injection moulding of plastic in one piece. According to a further development of the invention, the clip is removed from the mould when warm. As a result the clip contracts on cooling, so that a greater clamping force can be achieved. As a result the clip can be made very flat, because it is possible to almost completely fill its inner space between the two legs with the sheets to be secured. The clip can be slid onto sheets without any opening thereof being necessary.

Further features, details and advantages of the invention can be gathered from the following description of a preferred embodiment of the invention and the attached drawings, wherein show:

FIG. 1 on a larger scale, a side view of the empty clip.

FIG. 2 a side view of the clip provided with several sheets of paper.

FIG. 3 the empty clip in the open state.

FIG. 4 a front view of a clip on a smaller scale than in FIGS. 1 to 3.

FIGS. 5 to 8 a perspective view of the clip.

FIG. 1 is a side view of a clip proposed by the invention, i.e. in the direction of the edge of the paper sheets to be clipped together with the clip.

The clip contains a first leg 1, which is shaped on a web 2, which runs approximately at right angles to the leg 1. Onto the web 2 is shaped a second leg 3, which runs roughly parallel to the first leg 1 and also has roughly the same length. Considered from the side, the clip is roughly U-shaped. In the represented undeformed state, the free ends 4, 5 of the two legs 1, 3 engage on one another at one point with a certain spacing from the free ends or have only a limited spacing. The insides of the free ends 4, 5 of both legs 1, 3 are bevelled for forming an inclined surface 6 facilitating insertion.

On the inside of the first leg 1, at the top in FIG. 1, is shaped in one piece a locking leg 7, which is inclined in the direction of the opposite leg 3 and the web 2 from the leg 1 on which it is shaped. The free end 8 of the locking leg is at a short distance in front of the inside 9 of the facing leg 3, a direct contact also being possible.

A field 10 with narrow ribs is formed on the outside in the vicinity of the free end 4 of the upper leg in FIG. 1. The ribs run perpendicular to the paper plane and form a field which can be more easily grasped by a user. They also serve to mark the side of the clip considered to be the front.

The clip shown in the undeformed state in FIG. 1 can be slid onto the front edge of a stack of paper sheets 11, the legs 1, 3 spreading outwards in order to permit the insertion of the paper stack. The paper stack is inserted to such an extent that its leading edge 12 engages on the inside 13 of the clip web 2. In side view, said inside is linear or planar, so that all the sheets of the stack 11 can be inserted by the same amount. On insertion, there is a slight pivoting of the locking leg 7, so that the paper can be shoved through between it and the inside 9 of the opposite leg 3. In the state shown in FIG. 2, where a paper stack has been inserted up to the inside 13 of the web 2, there is a fixing between the locking leg 7 and the opposite inside 9 of the leg 3. As a function of the thickness of the paper stack, the ends of the inclined surfaces 6 can also cooperate in clipping.

The upper leg 1 in FIG. 1, i.e. the leg on whose inside is shaped the locking leg 7, is provided roughly in the centre of its longitudinal extension with a film hinge 14, which is formed by a reduction of the cross-section of the leg 1. Along an inclined surface 16, the inside 15 of the leg 1 approaches the outside, which has a convex curvature in the area of the film hinge 14. Immediately alongside the film hinge, i.e. on the side thereof facing the free end 4 of the leg 1, is shaped the locking leg 7. The film hinge makes it possible to open the front part of the front leg 1 in the clockwise direction in FIG. 1, i.e. to flap the front part of the leg 1 away from the opposite leg 3. The free end 8 of the locking leg 7 slides over and beyond a prominence 17. This prominence 17 is located at the front end of a concave depression 18, in which the free end 8 of the locking leg 7 is located in the undeformed state. On the side of the prominence 17 facing the free end 5 of the leg 3 is formed a slowly rising ramp 19. If the front part of the front leg 1 is opened in the described manner, the free end 8 of the locking leg 7 slides over the prominence 17 until it has reached a position shown in FIG. 3. Here the free end 8 of the locking leg 7 rests on the ramp 19. If, in said open position, the clip is to be shoved onto a stack of paper sheets, the user can somewhat further open the open end 4 of the leg 1, so that then there is a larger gap between the locking leg 7 and the facing leg 3. The paper stack can be slid into said gap. The user then presses closed the open part of the leg 1 in the counterclockwise direction, the free end 8 of the locking leg 7 pivoting via the ramp 19 and prominence 17 into the depression 18. This leads to a clearly perceptible locking effect, which indicates to the user that fixing has now occurred. The side of the prominence 17 facing the concave depression 18 drops away much more than the ramp 19. This is intended to prevent an excessively easy opening of the clip. The dropping away of the prominence 17 towards the depression 18 is chosen in such a way that the locking leg 7 with its planar front 20 runs approximately tangentially to said drop.

The clip proposed by the invention can be used for clipping together paper sheets in the two ways described hereinbefore, on the one hand by simply sliding on as in FIGS. 1 and 2 and on the other in the manner described relative to FIG. 3.

FIG. 4 shows on a smaller scale a front view of the clip, i.e. from the top in FIGS. 1 and 2. It is clear that the length of the legs 1, 3, i.e. the dimensions from top to bottom in FIG. 4, is somewhat greater than the transverse dimension of the clip, measured from right to left in FIG. 4.

Figure 5:
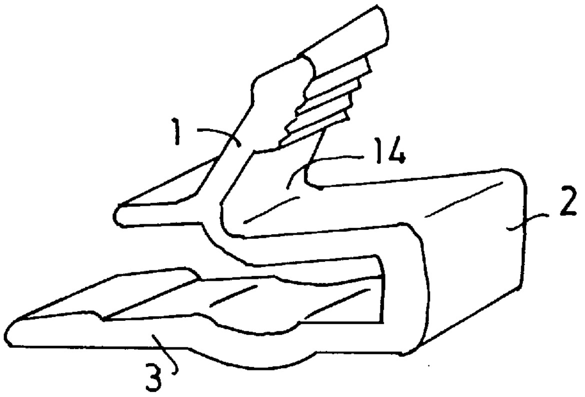
FIGS. 5 to 8 are perspective views of the clip in different positions, whereof that of FIG. 8 corresponds to FIG. 2.
Figure 6:
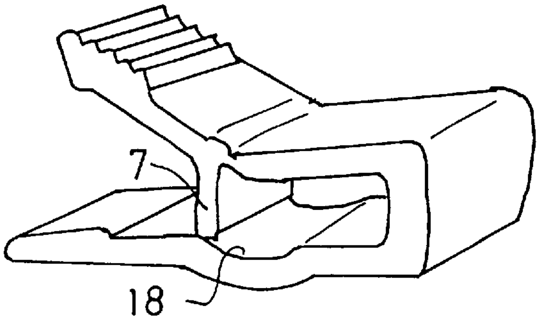
Figure 7:
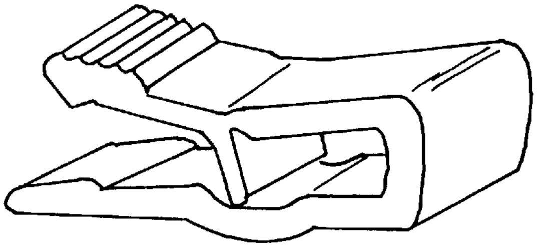

In FIG. 5 the clip is completely open, but cannot remain in this position by its own accord. If a user releases the completely open clip, cf. FIG. 5, as a result of the material characteristics it passes into the position of FIG. 6, where the locking leg 7 is supported on the prominence in front of the depression 18. If the user now presses on the field 10, the clip snaps shut, cf. FIG. 7.

Figure 8:
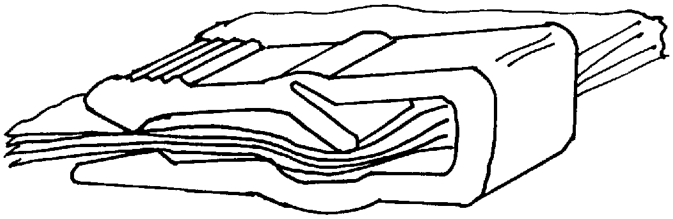

FIG. 8 shows the situation when several paper sheets are interconnected with the aid of the clip.

The clip proposed by the invention can be produced in one piece from plastic by injection moulding.

I claim:

1. A clip for clipping together flat material layers, particularly paper sheets, having a front leg having a flat side, a rear leg having a flat side, a web interconnecting the two legs in such a way that the flat sides of the front leg and the rear leg face one another, the rear leg having a free end and having a concave depression between the web and the free end, the front leg and the rear leg running roughly parallel to one another and the front leg having a single film hinge which is positioned approximately opposite the concave depression, and a single locking leg which in absence of the material layers extends inwardly between the two legs into the concave depression from a portion of the front leg, the portion being located on one side of the film hinge towards the free end of the rear leg, and wherein the single locking leg is initially inclined in the direction of the web.

2. The clip according to claim 1, wherein the inside of the free end of at least one end of the clip is beveled.

3. The clip according to claim 1, wherein the outside of the front leg is grooved or roughened in the vicinity of the free end.

4. The clip according to claim 3, wherein the web and the legs have substantially the same width throughout.

5. The clip according to claim 3, wherein both the front leg and the rear leg are of roughly the same length.

6. The clip according to claim 3, wherein the locking leg contacts the rear leg.

7. The clip according to claim 1, wherein the end of the depression remote from the web is defined by a prominence.

8. The clip according to claim 7, wherein a ramp is formed between the free end (5) of the rear leg and the prominence.

9. The clip according to claim 8, wherein the prominence steeply drops away towards the concave depression and the front of the locking leg runs tangentially to the drop in the prominence.

10. The clip according to claim 7, wherein roughly in the center between the web and the free end of the front leg, the locking leg (7) is shaped onto the front leg.

11. The clip according to claim 1, wherein the film hinge is flexible to permit pivoting of the locking leg, the free end of the locking leg moving in an arc and in absence of the material layers penetrating an inner contour of the depression of the facing rear leg.

12. The clip according to claim 1, wherein the clip is injection moulded in one piece from plastic.

* * * * *